United States Patent
Li et al.

(10) Patent No.: US 8,928,759 B2
(45) Date of Patent: Jan. 6, 2015

(54) SYSTEM AND METHOD OF IMPLEMENTING A COGNITIVE RADIO DEVICE WITH ENHANCED SPECTRUM SENSING

(75) Inventors: Lingjie Li, Ottawa (CA); Jung Yee, Ottawa (CA)

(73) Assignee: Aurora Wireless, Inc., Ottawa (CA)

( * ) Notice: Subject to any disclaimer, the term of this patent is extended or adjusted under 35 U.S.C. 154(b) by 208 days.

(21) Appl. No.: 13/489,078

(22) Filed: Jun. 5, 2012

(65) Prior Publication Data

US 2012/0315855 A1 Dec. 13, 2012
US 2013/0165051 A9 Jun. 27, 2013

Related U.S. Application Data

(63) Continuation-in-part of application No. 13/275,006, filed on Oct. 17, 2011, now Pat. No. 8,692,891, which is a continuation-in-part of application No. 13/235,220, filed on Sep. 16, 2011, now abandoned.

(60) Provisional application No. 61/494,689, filed on Jun. 8, 2011.

(51) Int. Cl.
| | |
|---|---|
| H04N 17/00 | (2006.01) |
| H04N 17/02 | (2006.01) |
| H04N 5/50 | (2006.01) |
| H04W 4/00 | (2009.01) |
| H04B 17/00 | (2006.01) |
| H04W 16/14 | (2009.01) |
| H04W 64/00 | (2009.01) |

(52) U.S. Cl.
CPC .............. *H04W 16/14* (2013.01); *H04W 64/00* (2013.01)

USPC .......... 348/192; 348/180; 348/735; 370/329; 370/252; 455/67.7

(58) Field of Classification Search
None
See application file for complete search history.

(56) References Cited

U.S. PATENT DOCUMENTS

| | | | |
|---|---|---|---|
| 8,150,328 B2 * | 4/2012 | Chaudhri et al. | 455/67.11 |
| 2009/0102981 A1 | 4/2009 | Mody | |
| 2010/0124254 A1 | 5/2010 | Wu et al. | |
| 2010/0182928 A1 * | 7/2010 | Wu et al. | 370/252 |
| 2010/0195590 A1 * | 8/2010 | Park | 370/329 |
| 2010/0309317 A1 * | 12/2010 | Wu et al. | 348/180 |
| 2011/0043710 A1 * | 2/2011 | Samarasooriya et al. | 348/735 |
| 2011/0116484 A1 | 5/2011 | Henry | |
| 2012/0120904 A1 * | 5/2012 | Seok et al. | 370/329 |

FOREIGN PATENT DOCUMENTS

| | | |
|---|---|---|
| EP | 2 317 814 A1 | 5/2011 |
| WO | 2011008424 A2 | 1/2011 |

OTHER PUBLICATIONS

Murty et al. "SenseLess: A Database-Driven White Spaces Network." 6th IEEE Symposium on Dynamic Spectrum Access Networks (DySpan). 2011. 12 pages.

(Continued)

*Primary Examiner* — Jefferey Harold
*Assistant Examiner* — Sean Haiem
(74) *Attorney, Agent, or Firm* — Procopio, Cory, Hargreaves & Savitch LLP

(57) ABSTRACT

A cognitive radio band device uses information gleaned from a database inquiry based on geo-location information in combination with spectrum sensing to determine if cognitive radio channels are available for unlicensed use.

37 Claims, 6 Drawing Sheets

(56) References Cited

OTHER PUBLICATIONS

Federal Communications Commission Order No. FCC 10-174, Adopted Sep. 23, 2010. In the Matter of Unlicensed Operation in the TV Broadcast Bands—Additional Spectrum for Unlicensed Devices Below 900 MHz and in the 3 GHz Band. 88 pages.

Ecclesine. IEEE P802.11, Wireless LANs. FCC TVWS orders Jan 11 consolidated text. Jan. 2011. 23 pages.

A copy of the extended European search report for related EP 12171239.2, Sep. 19, 2012, in 6 pages.

Kang. "Spectrum Sensing Issues in Cognitive Radio Networks." ISCIT 2009. 9th International Symposium on Communications and Information Technology. Sep. 28, 2009. pp. 824-828.

\* cited by examiner

SYSTEM AND METHOD OF IMPLEMENTING A COGNITIVE RADIO DEVICE WITH ENHANCED SPECTRUM SENSING

RELATED APPLICATIONS

The present application is a continuation-in-part of U.S. patent application Ser. No. 13/275,006 filed Oct. 17, 2011, which is a continuation-in-part of U.S. patent application Ser. No. 13/235,220 filed Sep. 16, 2011, which claims the benefit of U.S. provisional application No. 61/494,689 filed Jun. 8, 2011, all of which are incorporated herein by reference in their entirety.

FIELD OF THE INVENTION

This invention relates in general to cognitive radio and, in particular, to an efficient spectrum sensor for cognitive radio spectrum management.

BACKGROUND OF THE INVENTION

With the transition from analog to digital TV, empty TV channels are now available for use by other wireless applications. These empty channels are called TV white space. The two most common means of protecting licensed services (incumbents) that operate in the TV band are: the use of geo-location information with database inquiry; and, TV white space spectrum sensing by TV band devices.

A TV band device that uses the geo-location information with database inquiry technique provides a TV white space database with its current location, and the database responds with a list of available TV white space channels that the TV band device may use. The TV band device then transmits on one or more of those channels. Although this method is simple and efficient, it has certain drawbacks. One drawback is that the geo-location information needs to be very accurate. If the geo-location information provided to the database is not precise, the database must be operated on a principle that the TV band device may be anywhere within an area indicated by a lowest level of specificity of the geo-location information provided. The database is therefore programmed to protect incumbents by returning conservative inquiry results, which compromises TV white space utility.

As an alternative, a TV band device may use spectrum sensing to locate unused TV white space channels. For example, in a recent FCC ruling for TV white space, sense-only TV band devices are permitted to rely exclusively on spectrum sensing to detect available TV white space channels. The sensitivity level is −114 dBm for ATSC and NTSC signals, and −107 dBm for low power auxiliary signals including wireless microphone signals. These sensitivity levels need to be achieved in the presence of an adjacent channel ATSC signal as strong as −28 dBm.

However, the sense-only mode has some fundamental technical drawbacks which make it difficult to implement. First, the sensitivity levels set by governing authorities are difficult to achieve, especially in the presence of high power adjacent channel signals. Second, while spectrum sensing can determine the existence of a signal in a TV channel, as well as the type of signal that was detected, spectrum sensing cannot tell if the signal originated from a licensed or an unlicensed source. Third, the sense-only mode does not provide a mechanism to permit a governing authority to exclude the TV band device from any particular channel, if required. Furthermore, there are many types of licensed signals in the TV band, and the spectrum sensing capability of a TV band device may only be capable of detecting certain ones of those licensed signal types, which leaves those undetectable types of licensed signals unprotected. There are also certain excluded areas, such as along the U.S./Canadian border region, and areas around radio astronomy receiver sites where TV band devices may not be permitted to utilize TV white space. As understood by those skilled in the art, it may prove difficult to use spectrum sensing to determine if a TV band device is within an excluded area.

It is also now being recognized that TV white space is not the only spectrum band that requires spectrum management. The problems discussed above also apply to any unlicensed band, including the 900 MHz, 3.5 GHz, 5 GHz, and 60 GHz bands.

There therefore exists a need for a system and method of implementing a cognitive radio device with enhanced spectrum sensing.

SUMMARY OF THE INVENTION

Systems and methods of implementing a cognitive radio device with enhanced spectrum sensing are provided.

In one aspect, the invention provides a system for implementing a cognitive radio band device with enhanced spectrum sensing, comprising: a variable resolution geo-location server that receives geo-location information from the cognitive radio band device, translates the geo-location information into a location indicator, and returns the location indicator to the cognitive radio band device; a cognitive radio band spectrum database front end that receives the geo-location indicator from the cognitive radio band device and uses the location indicator to compile an available spectrum map that is returned to the cognitive radio band device; and a spectrum sensor available to the cognitive radio band device, the spectrum sensor being adapted to detect certain cognitive radio band signal types.

In another aspect, the invention provides a cognitive radio band device, comprising: a spectrum sensor adapted to sense certain cognitive radio band signal types; memory for storing geo-location information; memory for storing an operating/backup channel list; and cognitive radio spectrum management logic that comprises program instructions adapted to communicate with the spectrum sensor and access the geo-location information and operating/backup channel list in the memory.

In another aspect, the invention provides a method of enhancing spectrum sensing by a cognitive radio band device, comprising: providing a variable resolution geo-location server with geo-location information available to the cognitive radio band device; receiving a location indicator from the variable resolution geo-location server; passing the location indicator to a cognitive radio spectrum database front end to request a available spectrum map from the cognitive radio spectrum database front end; and inspecting the available spectrum map to prepare a sensing map for a spectrum sensor of the cognitive radio band device.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE PREFERRED EMBODIMENTS

A cognitive radio device registers with a cognitive radio spectrum database using variable resolution geo-location information; and the database responds with an available spectrum map. After analyzing the spectrum map, the cognitive radio device conducts spectrum sensing on cognitive radio channels that are potentially available for use, and combines the sensing results with the spectrum map to determine which cognitive radio channel(s) to use. The cognitive radio device enables reliable protection for licensed services, and maximizes cognitive radio channel utility. Variable resolution geo-location resolves the problem of how to accurately determine the location of a cognitive radio device in an indoor environment. With the information obtained from both spectrum sensing and database inquiry, the loss of cognitive radio channel utility due to an inaccurate propagation model used by the cognitive radio spectrum database and lower geo-location information accuracy is reduced. The disclosed systems and methods also enable governing authorities to exclude a cognitive radio device from one or more channels, if necessary. Moreover, the influence of cognitive radio jammers can be reduced. The database inquiry results can also be used to identify cognitive radio jammers, mitigating the problem that spectrum sensing cannot determine whether a detected signal is from a licensed source. The cognitive radio device may be a TV white space device or a radio device that operates in any other unlicensed radio band, including the 900 MHz; 3.5 GHz, 5 GHz, and, 60 GHz bands.

Figure 1:
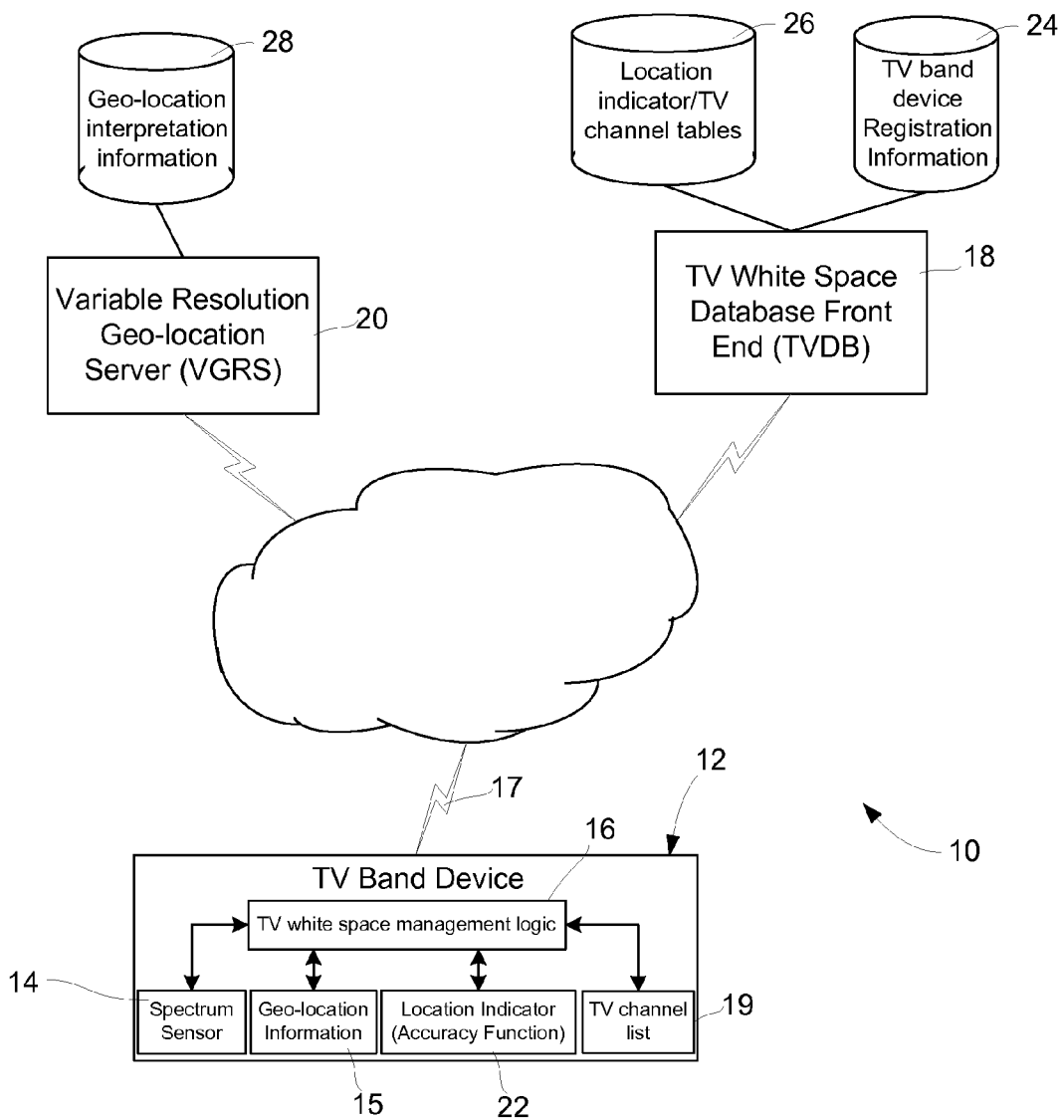
FIG. 1 is a schematic diagram of a system for implementing a TV band device with enhanced spectrum sensing in accordance with the invention.

FIG. 1 is a schematic diagram of a system 10 for implementing a TV band device 12 with enhanced spectrum sensing in accordance with the invention. The TV band device 12 has a spectrum sensor 14 that can detect whether one or more certain detectable signal types is/are present in a given TV channel, using methods that are known in the art and described for example in United States patent application publication US 2011/0043710A1, the specification of which is herein incorporated by reference in its entirety. The TV band device 12 also has a memory for storing geo-location information 15, which is input by a user, or otherwise acquired by the TV band device 12, and TV white space management logic 16 stored in the memory. The TV white space management logic has program instructions adapted to communicate with the spectrum sensor 14 and interpret sensing information the spectrum sensor 14 outputs. The TV white space management logic 16 also has program instructions adapted to access to the geo-location information 15 stored in the memory and extract the information and package it for communication. The TV white space management logic 16 likewise has program instructions adapted to access a communications link 17 to communicate with a TV white space database front end 18, hereinafter the TVDB 18. The TV white space management logic 16 also has program instructions adapted to communicate via the communications link 17 with a variable resolution geo-location server 20, hereinafter the VRGS 20. All communications with the TVDB 18 and the VRGS 20 are controlled by the TV white space management logic 16 using known communication methods. The TV white space management logic 16 also has program instructions adapted to receive a TV channel list 19 from the TVDB 18 and store it in memory. The structure and function of the TV channel list 19 will be explained in detail below with reference to FIGS. 2 and 3.

The TVDB 18 has access to a database of TV band device registration information 24 that it dynamically maintains. The TVDB 18 also has access to a location indicator/TV channel table database 26 that is maintained, for example, by a government authority. The VRGS 20 transforms the geo-location information 15 provided by the TV band device 12 into a location indicator 22 using geo-location interpretation information stored in a database 28. The location indicator 22 is stored by the TV band device 16. The location indicator 22 is in a format that can be utilized by the TVDB 18 to extract TV channel information from the location indicator/TV channel tables 26, as will be explained below in more detail.

Figure 2:
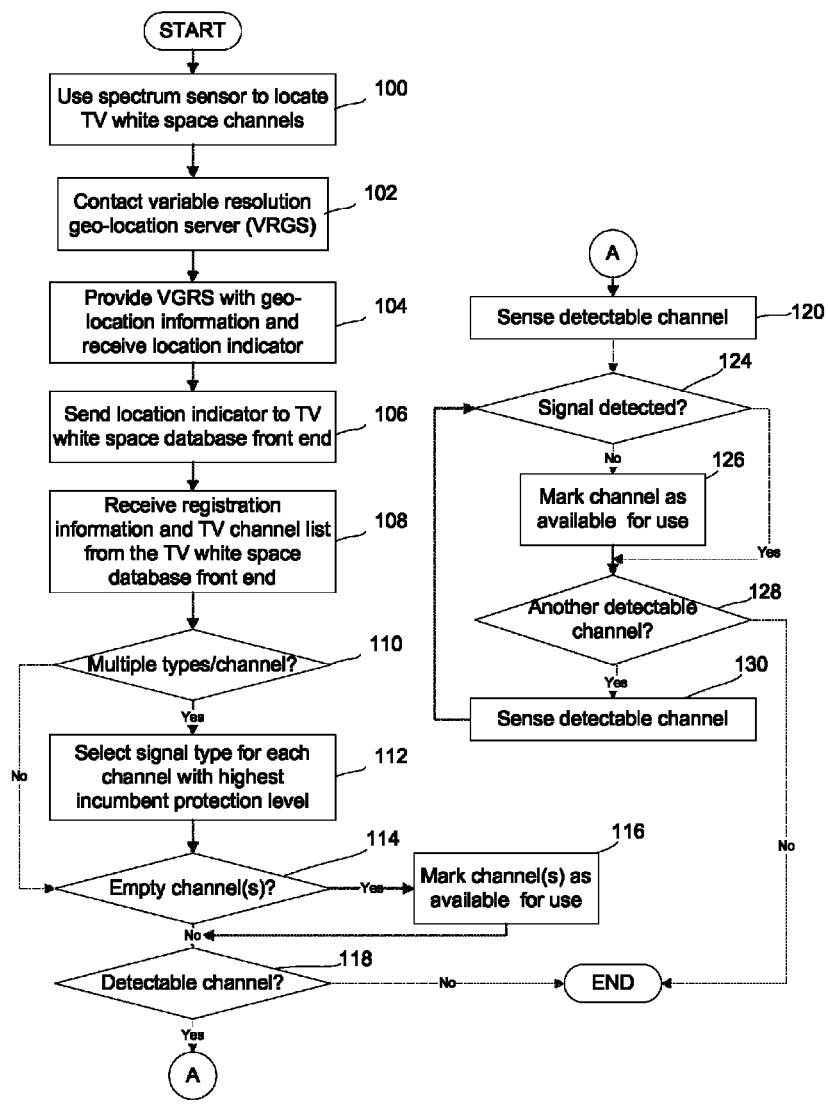
FIG. 2 is a flow chart of an overview of one implementation of a sensing procedure used by the TV band device shown in FIG. 1.

FIG. 2 is a flow chart illustrating principal steps in a method in accordance with the invention. When the TV band device 12 begins operation, the TV white space management logic 16 instructs the spectrum sensor 14 to locate (100) TV white space channels. The TV white space management logic 16 then uses one of the white space channels, or another communications link, to contact (102) the VRGS 20. The TV white space management logic 16 provides (104) the VRGS 20 with its geo-location information 15 stored in memory in a predefined format. The geo-location information 15 may be, by way of example only, any one or more of the following:

Zip code or postal code;
City/town, county, and/or province/state name;
Detailed address: unit number, street, town, etc.;
Longitude and latitude with a standardized indication of their accuracy;
Location information generated by some other geo-location mechanism.

The geo-location information 15 stored in the memory of the TV band device 12 and sent to the VRGS 20 is interpreted by the VRGS 20 to create the location indicator 22 for the TV band device 12. The VRGS 20 may also be provisioned with logic to associate an optional location accuracy function with each location indicator 22 it returns to the TV band device 12. If provided, the location accuracy function is expressed in a format that can be used by the TVDB 18. The VRGS 20 responds (104) to the TV band device 12 with the location indicator 22, which is in a format that can be used by the TVDB 18 to access the location indicator/TV channel table database 26. The VRGS 20 may also return the optional location accuracy function with the location indicator 22. The TV white space management logic 16 stores the location indicator 22 in memory, and then sends (106) the location indicator 22, and the optional location accuracy function if provided, to the TVDB 18 for registration. If no location accuracy function is received, then a pre-determined accuracy function may be assigned by the TVDB 18. In one embodiment the TV white space management logic 16 also sends spectrum sensing capabilities of the spectrum sensor 14 expressed in a standardized format, with the location indicator 22 to the TVDB 18. For example, the TV white space management logic 16 sends a list that details each type of signal that the spectrum sensor 14 can reliably detect.

The TVDB 18 registers the TV band device 12, and responds (108) with registration information and the TV channel list 19, which provides signal types for all TV channels in which the TV band device 12 may operate. If the TV white space management logic 16 has sent sensing capability information to the TVDB 18, the TVDB 18 sends preset signal types used to indicate what wireless signal is, or may be, present on each channel within the area specified by the location indicator 22. Those preset signal types include: prohibited, undetectable, detectable, and empty. The signal type "prohibited" is used to indicate that a channel cannot be used by TV band devices operating in the area, and the signal type "empty" is used to indicate that a TV channel is available for unlicensed usage.

The signal type "detectable" indicates that signals on the TV channel can be reliably detected by the TV band device 12 using the spectrum sensor 14. If a TV channel is licensed for use by a signal which cannot be reliably detected by the spectrum sensor 14, the signal type "undetectable" is associated with that TV channel. It is possible that more than one type of signal is present within the local area defined by the location indicator 22. As an example, part of the area may be within a DTV protected contour, and another part within a prohibited region. In such a case, the signal type that represents the highest level of incumbent protection is communicated by the TVDB 18 to the TV band device 12. In accordance with the invention, "prohibited" has the highest protection level, next is the "undetectable" signal type, the third level is the "detectable" signal type, and "empty" is the lowest protection level. In this example, "prohibited" should be used for the signal type in the whole area. To ensure incumbent signal protection, the lower the level of location accuracy, the more conservative is the TV channel list 19 provided by the TVDB 18.

If the TV white space management logic 16 does not send sensing capability information, the TVDB 18 returns more detailed signal types to the TV band device 12. Consequently, "detectable" and "undetectable" signal types can be replaced by physical signal types such as ATSC, NTSC, wireless microphone, etc. For example, a channel may contain signals of types "ATSC" and "wireless microphone". If both signals are detectable by the TV band device 12, it can conduct spectrum sensing on both signals. If the TV band device 12 can only detect ATSC signals, then this channel is "undetectable" and cannot be used by the TV band device 12.

In either instance, the TV white space management logic 16 determines (110) whether the TV channel list 19 includes multiple signal types per channel. If so, TV white space management logic 16 (112) selects the signal type from the list with the highest incumbent protection level as the signal type for that channel.

Table 1 lists possible signal types that may be associated with a TV channel, as well as the signal type selected (112) by the TV band device 12 for the TV channel.

TABLE 1

| Signal types included in the channel (marked by "x") | | | | Signal type used by TV |
|---|---|---|---|---|
| Empty | Detectable | Undetectable | Prohibited | band device |
|  |  |  | x | Prohibited |
|  |  | x |  | Undetectable |
|  |  | x | x | Prohibited |
|  | x |  |  | Detectable |
|  | x |  | x | Prohibited |
|  | x | x |  | Undetectable |
|  | x | x | x | Prohibited |
| x |  |  |  | Empty |
| x |  |  | x | Prohibited |
| x |  | x |  | Undetectable |
| x |  | x | x | Prohibited |
| x | x |  |  | Detectable |
| x | x |  | x | Prohibited |
| x | x | x |  | Undetectable |
| x | x | x | x | Prohibited |

For the TV channels included in the database inquiry response, channels which are "prohibited" or with "undetectable" signal types cannot be used by the TV band device 12. Channels which are "empty" can be used by the TV band device 12 without spectrum sensing. The remaining channels with "detectable" signal types must be sensed prior to use. For each TV channel indicated as having "detectable" signals, if the spectrum sensor 14 cannot find a signal on the channel, then the TV band device 12 can use the channel, otherwise the TV band device 12 cannot use it. Table 2 shows the decision process performed by the TV white space management logic 16 for each of the four signal types.

TABLE 2

| Signal type | TV white space management logic decision |
|---|---|
| Prohibited | Channel not used |
| Undetectable | Channel not used |
| Empty | Channel can be used without sensing |
| Detectable | Channel can be used if spectrum sensing detects no signal |
|  | Channel not used if spectrum sensing detects a signal |

Consequently, after the TV white space management logic 16 selects, if required, the signal type for each channel in the TV channel list 19 provided by the TVDB 18, the TV white space management logic 16 determines (114) if there are one or more channels with the "empty" signal type. If so, the TV white space management logic 16 marks (116) those channel(s) as available for use. The TV white space management logic 16 then reviews the TV channel list 19 and determines (118) if there are one or more channels that carry "detectable" signals. If not, the process ends. Otherwise, the TV white space management logic 16 instructs the spectrum sensor 14 to sense (120) the first "detectable" channel for detectable signals. If a signal is not detected (124), the TV white space management logic 16 marks that channel as available for use (126). If a signal is detected (124), the TV white space management logic 16 determines (128) if there is another channel in the list with the "detectable" signal type. If so, the spectrum sensor 14 is instructed to sense that channel (130) and the process returns to step (124), until the TV white space management logic 16 has had all of the channels with the "detectable" signal type sensed by the spectrum sensor 14 to determine if they carry detectable signals.

As explained above, the unique signal type "prohibited" may be used by governing authorities to exclude TV band device 12 transmissions from a given TV channel in a specific geographic area. When the TV white space management logic 16 contacts the TVDB 18 for registration, all channels that are listed as "prohibited" by the TVDB 18 cannot be used by the TV band device 12. Alternatively at any time deemed necessary, governing authorities may ask the TVDB 18 to send an updated TV channel list 19 to all TV band devices 12 that are registered in a given geographic area to exclude their transmissions from certain channels. As an example, if a governing authority received telephone calls from DTV customers in a building complaining about interference on a specific TV channel, the government authority could choose to mark that channel as "prohibited" in the local area surrounding the building. The TVDB 18 would then be requested to send an updated TV channel list 19 to all TV band devices 12 within that area to exclude their transmissions from that particular TV channel.

As will be understood by those skilled in the art, a jammer can only influence a TV band device 12 using the disclosed system and methods if the jammer broadcasts a signal type that can be detected by the spectrum sensor 14. Furthermore, the TV white space management logic 16 does not instruct the spectrum sensor 14 to sense channels with "undetectable", "prohibited" or "empty" signal types. In other words, those channels cannot be jammed. If a channel is "empty" but a detectable signal appears on it, the signal is most likely a jamming signal. This renders jamming more difficult to accomplish, as well as less harmful.

The disclosed system and methods also provide better protection for incumbent TV signals. For channels with the "undetectable" signal type, or if the TV band device 12 is located in an excluded area such as the U.S./Canadian border region, the method described above enables the geo-location and database lookup approach to provide incumbent protection, because such signal types cannot be reliably protected by spectrum sensing alone. Furthermore, for channels with "detectable" signal types, spectrum sensing results are used to determine if licensed signals are present. And, as explained above the "prohibited" signal type provides governing authorities with a capability to exclude TV band devices 12 from broadcasting on any given channel, which ensures tailored incumbent signal protection.

Figure 3:
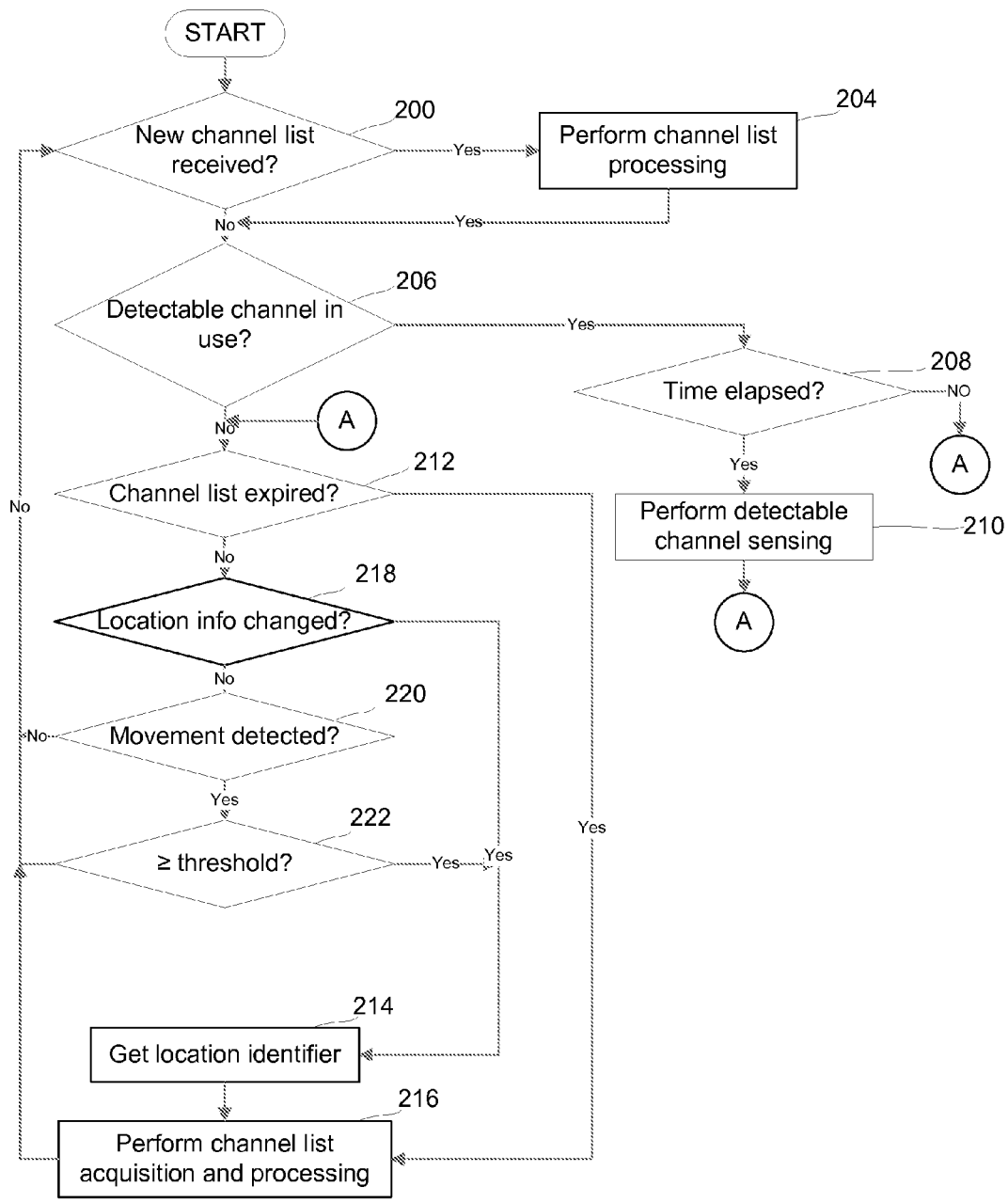
FIG. 3 is a flow chart of an overview of one implementation of a behavior of the TV band device after it has begun transmission on a TV white space channel.

FIG. 3 is a flow chart of one implementation of a method in accordance with the invention after the TV band device 12 has begun transmission on a TV white space channel. There may be many events or conditions that trigger the TV white space management logic 16 to conduct part, or all of, the TV white space channel location process. For example, as shown in FIG. 3, the TV white space management logic 16 must continually monitor (200) for receipt of a new TV channel list 19 from the TVDB 18, because a governing authority may direct the TVDB 18 to distribute the new TV channel list 19 to all TV band devices operating in a given region at any time. If a new TV channel list 19 is received from the TVDB 18, the TV white space management logic 16 must perform TV channel list processing (204) as described above with reference to steps (110)-(130) of FIG. 2.

If a new TV channel list 19 has not been received, the TV white space management logic 16 determines (206) if a white space channel with "detectable" type signals is currently being used. If so, the TV white space management logic 16 determines (208) if a predetermined period of permitted use without sensing has elapsed. If so, the TV white space management logic 16 performs detectable channel sensing (210) as described above with reference to steps (120)-(130) of FIG. 3. However, if the permitted use time without sensing has not elapsed, the TV white space management logic 16 determines (212) if the current TV channel list 19 has expired. The expiry time for a TV channel list 19 may be established by a standard, or assigned by the TVDB 18 each time it sends out a new TV channel list 19. If the current TV channel list 19 has expired, the TV white space management logic 16 performs (216) channel list acquisition and processing, as described above with reference to steps (106)-(130) of FIG. 2.

If the TV channel list 19 has not expired, the TV white space management logic 16 determines (218) if its location information has changed. If so, the TV white space management logic 16 sends (214) its new location information to the variable resolution geo-location server 20 and acquires and processes (216) a TV new channel list 19 as described above with reference to steps (104)-(130) of FIG. 2.

If the location information has not changed, the TV white space management logic 16 determines (220) if it has detected movement using any available motion sensing capability, for example global positioning system (GPS). If no motion has been detected, the TV white space management logic 16 returns to (200) and the process described above repeats. If motion has been detected, TV white space management logic 16 determines (222) if the extent of the movement exceeds a predetermined threshold, e.g. 50 meters. If so, the TV white space management logic 16 sends (214) its new location information to the variable resolution geo-location server 20 and acquires and processes (216) a TV new channel list 19 as described above with reference to steps (104)-(130) of FIG. 2.

As is well understood, the most commonly used geo-location method implemented in TV band devices 12 is GPS. However, GPS signals cannot be reliably received in an indoor environment. This makes incumbent protection using geo-location and database lookup difficult to implement for indoor TV white space applications. The disclosed systems and methods may solve this problem by allowing multiple geo-location methods with variable geo-location resolution. With reduced geo-location certainty, incumbent protection can be guaranteed by making database inquiry results more conservative; however, this results in fewer TV white space channels in the inquiry results. This drawback is overcome by the method described above by relying on the spectrum sensor 14 to determine if a channel is usable by the TV band device 12.

A spectrum sensor 14 that can detect some but not all broadcast signals (e.g. wireless microphone and other low bandwidth services cannot be detected) can be used by the TV band device 12. Of course, the fewer broadcast signals the spectrum sensor 14 of a TV band device 12 can detect, the fewer TV white space channels can be located and utilized by that TV band device 12, and the lower the TV white space efficiency. Moreover, with database inquiry results in accordance with disclosed embodiments, only TV channels with "detectable" signal types need to be sensed. This reduces the number of channels as well as the types of signals that must be sensed, which appreciably decreases sensing overhead.

Figure 4:
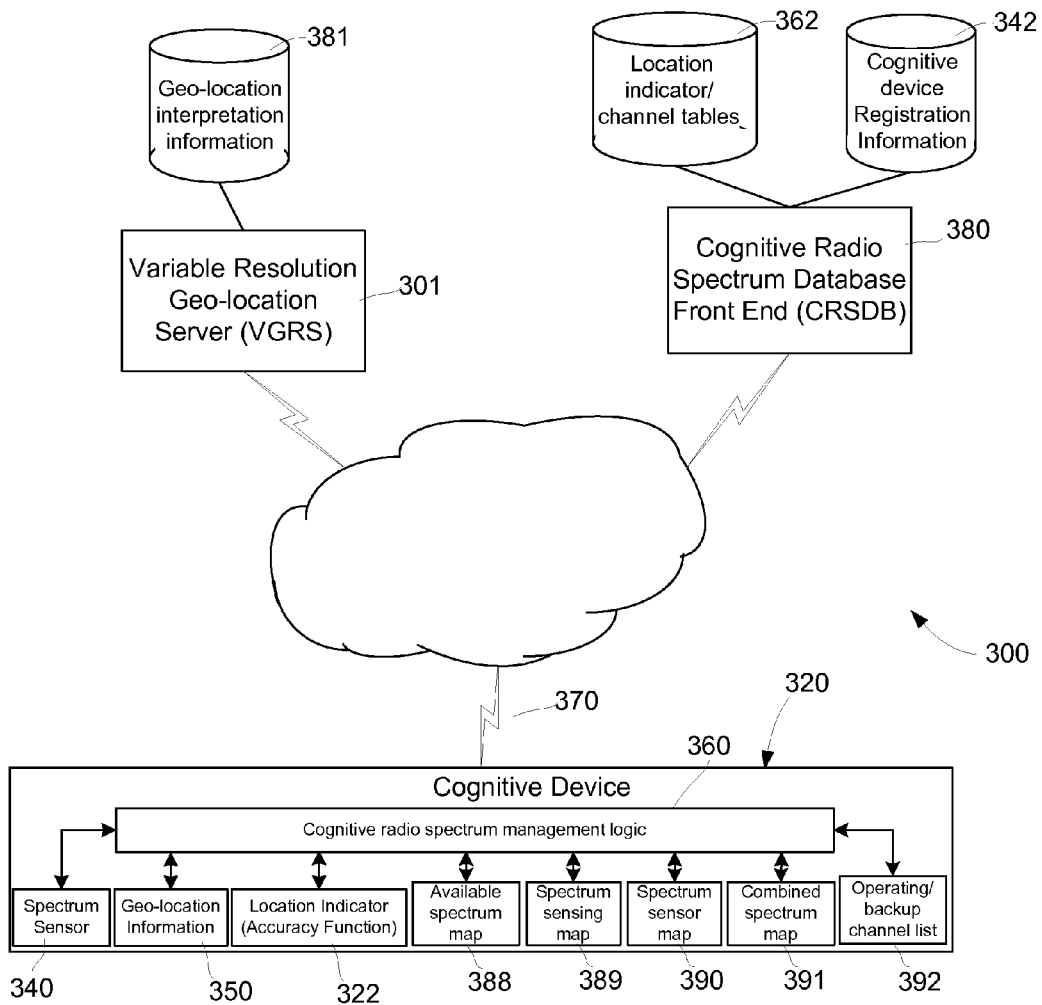
FIG. 4 is a schematic diagram of an embodiment of a system for implementing a cognitive radio device with enhanced spectrum sensing in accordance with the invention.

FIG. 4 is a schematic diagram of a cognitive radio system 300 for implementing a cognitive radio device 320 with enhanced spectrum sensing in accordance with the invention. The cognitive radio device 320 has a spectrum sensor 340 that can detect whether one or more certain detectable signal types is/are present in a given cognitive radio channel, using methods that are known in the art. The cognitive radio device 320 also has a memory for storing geo-location information 350, which is input by a user, or otherwise acquired by the cognitive radio device 320, and cognitive radio spectrum management logic 360 stored in the memory. The cognitive radio spectrum management logic 360 has program instructions adapted to communicate with the spectrum sensor 340 and interpret sensing information the spectrum sensor 340 outputs. The cognitive radio spectrum management logic 360 also has program instructions adapted to access the geo-location information 350 stored in the memory and extract the information and package it for communication. The cognitive radio spectrum management logic 360 likewise has program instructions adapted to access a communications link 370 to communicate with a cognitive radio spectrum database front end 380, hereinafter the CRSDB 380. The cognitive radio spectrum management logic 360 also has program instructions adapted to communicate via the communications link 370 with a variable resolution geo-location server 301, hereinafter the VRGS 301. All communications with the CRSDB 380 and the VRGS 301 are controlled by the cognitive radio spectrum management logic 360 using known communication methods. The cognitive radio spectrum management logic 360 also has program instructions adapted to receive an available spectrum map 388 from the CRSDB 380 and store it in memory. The available spectrum map 388 is used to create a spectrum sensing map 389 that is passed to the spectrum sensor 340, as will be explained below with reference to FIG. 5. The spectrum sensor 340 returns a spectrum sensor map 390 that is used in conjunction with the available spectrum map 388 to create a combined spectrum map 391, the purpose and function of which will also be explained below with reference to FIGS. 5 and 6. The cognitive radio spectrum management logic 360 likewise has program instructions adapted to inspect and maintain an operating/backup channel list 392 stored in memory. The operating/backup channel list 392 minimizes the sensing load imposed on the spectrum sensor 340, and therefore makes more air time available for communications. Further features of the structure and function of the operating/backup channel list 392 will also be explained in detail below with reference to FIGS. 5 and 6.

The CRSDB 380 has access to a database of cognitive radio device registration information 342 that it dynamically maintains. The CRSDB 380 also has access to a location indicator/channel table database 362 that is maintained, for example, by a regulatory authority. The VRGS 301 transforms the geo-location information 350 provided by the cognitive radio spectrum management logic 360 into a location indicator 322 using geo-location interpretation information stored in a database 381. The location indicator 322 is stored by the cognitive radio device 320. The location indicator 322 is in a format that can be utilized by the CRSDB 380 to extract cognitive radio channel information from the location indicator/channel tables 362, as will be explained below in more detail.

Figure 5:
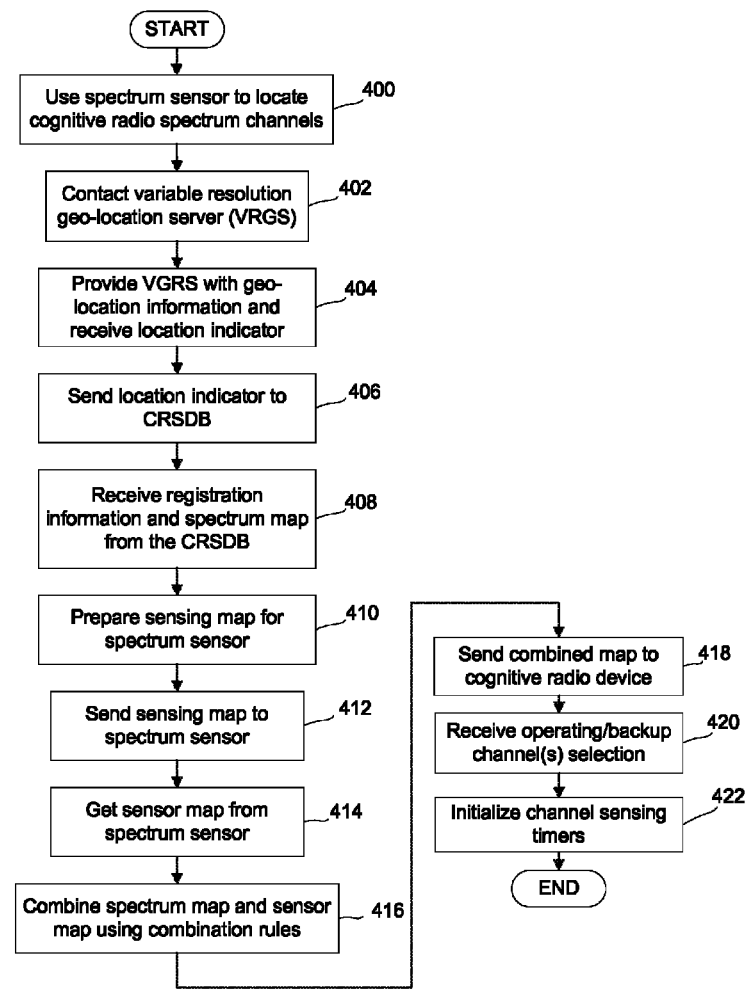
FIG. 5 is a flow chart of an overview of one implementation of a sensing procedure used by the cognitive radio device shown in FIG. 4.

FIG. 5 is a flow chart illustrating principal steps in a device start-up procedure for the cognitive radio device 320 in accordance with the invention. When the cognitive radio device 320 begins operation, the cognitive radio spectrum management logic 360 determines if there is an existing communication link it can use to contact the VRGS 301 and CRSDB 380. If there is no such link, or if the cognitive radio spectrum management logic 360 is programmed to use cognitive radio spectrum channel(s) for the communication, it may instruct the spectrum sensor 340 to locate (400) cognitive radio spectrum channels that are free of detectable signal types. The cognitive radio spectrum management logic 360 then requests that the cognitive radio device chose one of the channel(s), or some other communications link, to establish contact (402) with the VRGS 301. The cognitive radio spectrum management logic 360 provides (404) the VRGS 301 with its geo-location information 350 stored in memory. The geo-location information may be dependent on the cognitive radio band being utilized by the cognitive radio device 320.

As explained above with reference to FIG. 2, the geo-location information 350 may be, by way of example only, any one or more of the following:
  Zip code or postal code;
  City/town, county, and/or province/state name;
  Detailed address: unit number, street, town, etc.;
  Longitude and latitude with a standardized indication of their accuracy;
  Location information generated by some other geo-location mechanism.

The geo-location information 350 stored in the memory of the cognitive radio device 320 and sent to the VRGS 301 is interpreted by the VRGS 301 to derive the location indicator 322 for the cognitive radio device 320. The VRGS 301 may also be provisioned with logic to associate an optional location accuracy function with each location indicator 322 it returns to the cognitive radio device 320. If provided, the location accuracy function is expressed in a format that can be used by the CRSDB 380. The VRGS 301 responds (404) to the cognitive radio device 320 with the location indicator 322, which is in a format that can be used by the CRSDB 380 to access the location indicator/channel table database 362. The VRGS 301 may also return the optional location accuracy function with the location indicator 322. The cognitive radio spectrum management logic 360 stores the location indicator 322 in memory, and then sends (406) the location indicator 322, and the location accuracy function if provided, to the CRSDB 380 for registration. If the CRSDB 380 does not receive a location accuracy function, it may assign a predetermined accuracy function to the location indicator 322. In one embodiment the cognitive radio spectrum management logic 360 also sends spectrum sensing capabilities of the spectrum sensor 340 to the CRSDB 380. Those spectrum sensing capabilities are expressed in a standardized format. For example, the cognitive radio spectrum management logic 360 sends a list that details each type of signal that the spectrum sensor 340 can reliably detect.

The CRSDB 380 registers the cognitive radio device 320, and responds (408) with registration information and the available spectrum map 388, which provides signal types for all channels in which the cognitive radio device 320 may operate. If the cognitive radio spectrum management logic 360 has sent sensing capability information to the CRSDB 380, the CRSDB 380 sends preset signal types used to indicate what wireless signal(s) is, or may be, present on each channel within the area specified by the location indicator/optional accuracy function 322, as explained above.

If the cognitive radio spectrum management logic 360 does not send sensing capability information, the CRSDB 380 may return a more detailed available spectrum map 388 to the cognitive radio spectrum management logic 360. Consequently, signal categories may be replaced by physical signal types appropriate for the spectrum band used by the cognitive radio device 320. For example, a channel may contain signals that are detectable by the spectrum sensor 340, as well as signals that are not detectable by the spectrum sensor 340. If the spectrum sensor 340 cannot detect all signal types that may be present on a given channel, then that channel cannot be used by the cognitive radio device 320.

The cognitive radio spectrum management logic 360 uses the available spectrum map 388 received from the CRSDB 380 to prepare (410) a spectrum sensing map 389 for the spectrum sensor 340. The cognitive radio spectrum management logic 360 sends (412) the spectrum sensing map 389 to the spectrum sensor 340, which uses the spectrum sensing map 389 to sense indicated channels for detectable signals. After the spectrum sensor 340 has completed sensing all channels indicated in the sensing map 389, it returns (414) a sensor map 390 to the cognitive radio spectrum management logic 360. The sensor map 390 indicates which of the sensed channels had detectable signal types. The cognitive radio spectrum management logic 360 then uses (416) predetermined combination rules to combine the available spectrum map 388 and the sensor map 390. The combination rules may be specific to the spectrum of interest. In one embodiment the combination rules are weighted to compensate for the probability of false alarm and the probability of detection. When the combined spectrum map 391 is completed, the cognitive radio spectrum management logic 360 passes (418) the combined spectrum map 391 to the cognitive radio device 320. The combined spectrum map 391 includes all channels that may be used by the cognitive radio device for operation. On receipt of the combined spectrum map 391, the cognitive radio device 320 selects an operating channel(s). If the combined spectrum map 391 contains more available channel(s) beside the operating channel(s), the cognitive radio device 320 also selects a predetermined, or programmable, number of backup channel(s) to be used as the operating channel(s) in the event that the selected operating channel(s) becomes unavailable for any reason. The logic used to select the operating and the backup channel(s) is a matter of design choice. The operating and backup channel(s) list 392 is used by the cognitive radio spectrum management logic 360, to limit scanning requirements, and thus maximize air time available for communications. The cognitive radio spectrum management logic 360 receives (420) the operating/backup channel selection from the cognitive radio device 320, and stores the operating/backup channel list 392 in the memory for later use as will be explained below with reference to FIG. 6. The cognitive radio spectrum management logic 360 then initializes (422) any required or desired channel sensing timers. Different types of channels, namely operating channel(s), backup channel(s) and other channels optionally have respective timers initialized to different respective values. This is to satisfy the requirement of periodic channel validation. Depending on regulations and/or design options, the operating channel(s) may have to be sensed frequently, while backup channels may require less frequent sensing but must be sensed periodically to keep their available channel status up to date. All other channels may require periodic sensing in order to facilitate the selection of operating and backup channels when required. It should be noted that only channels with "detectable" signal types need to be sensed. If the available spectrum map contains physical signal types for a channel, then only the indicated physical signal types need to be sensed.

As explained above, governing authorities may exclude cognitive radio device transmissions from a given channel in a specific geographic region. When the cognitive radio spectrum management logic 360 contacts the CRSDB 380 for registration, any channel in the available spectrum map 388 provided by the CRSDB 380 may be indicated as a channel that cannot be used by the cognitive radio device 320. Alternatively, at any time deemed necessary governing authorities may ask the CRSDB 380 to send an updated available spectrum map 388 to all cognitive radio devices 320 that are registered in a given geographic region, to exclude their transmissions from certain channels. As an example, if a governing authority received complaints from wireless service customers in a building about interference on a specific channel, the government authority could choose to mark that channel as unavailable in the local area surrounding the building. The CRSDB 380 would then be requested to send an updated spectrum map 388 to all cognitive radio devices 320 within that area to exclude their transmissions from that particular channel.

As also explained above, using the disclosed systems and methods, a jammer can only influence a cognitive radio device 320 if the jammer broadcasts a signal type that can be detected by the spectrum sensor 340, and the signal type has been specified by the CRSDB 380 as a signal type that may be present on the channel. For example, if the spectrum sensor 340 can sense ATSC and NTSC signal types, and the CRSDB 380 indicates that only an ATSC signal should be present on a channel, then cognitive radio spectrum management logic 360 instructs the spectrum sensor 340 to only sense for ATSC signals on that channel, even though it has the capability to sense NTSC as well. As a result, if an NTSC jammer exists, it cannot jam that channel for the cognitive radio device 320. Furthermore, the cognitive radio spectrum management logic 360 does not include channels in the sensing map 389 that are indicated to be unavailable or empty by the available spectrum map 388 received from the CRSDB 380. In other words, those channels cannot be jammed. If a channel is "empty" but a detectable signal appears on it, the signal is most likely a jamming signal. This renders jamming more difficult to accomplish, as well as less harmful.

Figure 6:
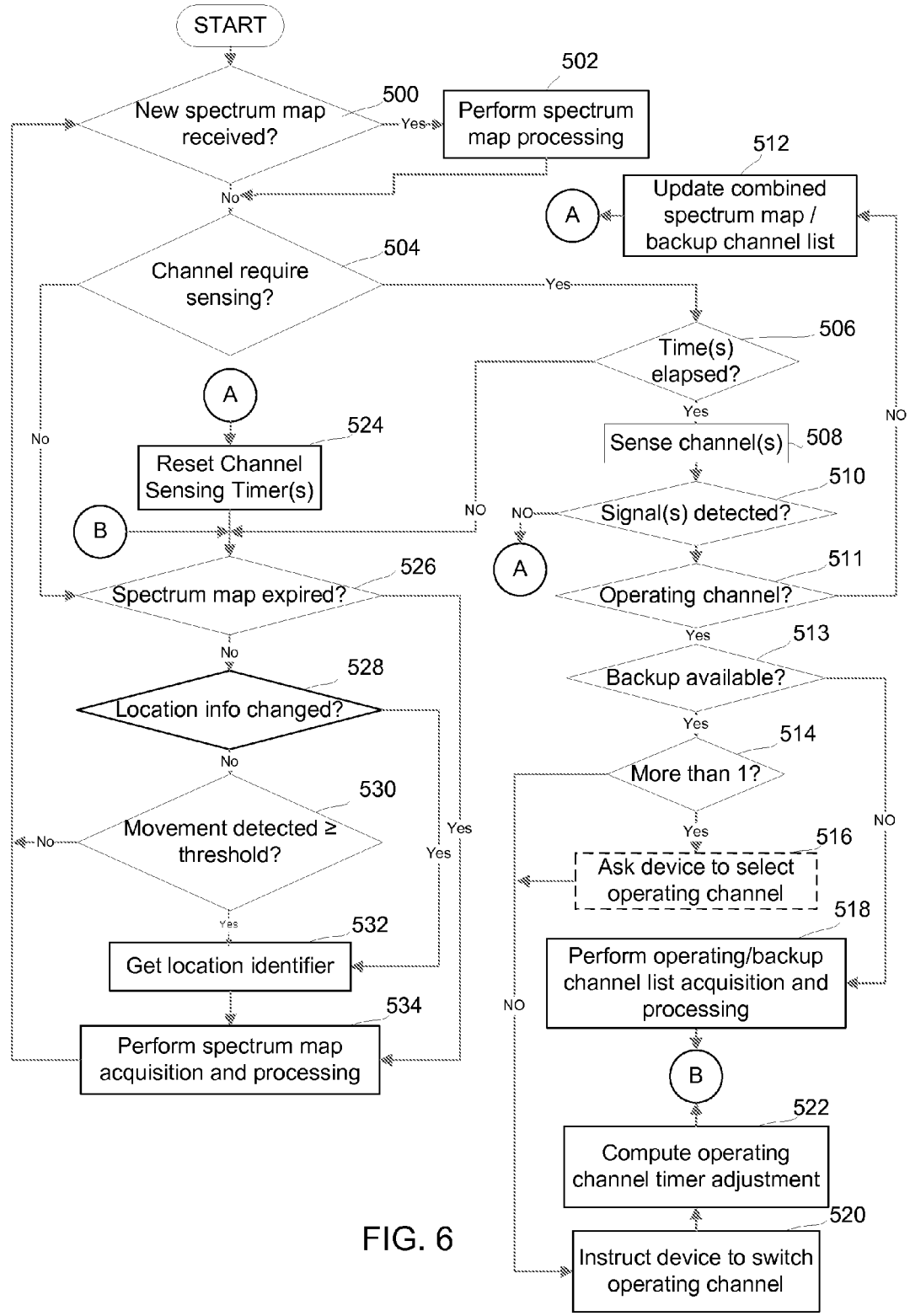
FIG. 6 is a flow chart of an overview of one implementation of a behavior of a signal sensing process performed by a cognitive radio device after it has begun transmission on an available channel.

FIG. 6 is a flow chart of one implementation of a method in accordance with the invention after the cognitive radio device 320 has selected the operating/backup channel(s) and the operating/backup channel list 392 has been stored by the cognitive radio spectrum management logic 360 in the memory. As shown in FIG. 6, the cognitive radio spectrum management logic 360 must continually monitor (500) for receipt of a new available spectrum map 388 from the CRSDB 380, because a regulatory authority may at any time direct the CRSDB 380 to distribute the new available spectrum map 388 to all cognitive radio devices 320 operating in a given region. If a new available spectrum map 388 is received from the CRSDB 380, the cognitive radio spectrum management logic 360 must perform (502) spectrum map processing as described above with reference to steps (410)-(420) of FIG. 5.

If a new spectrum map 388 has not been received, the cognitive radio spectrum management logic 360 determines (504) if any channel in the combined spectrum map 391 is a channel that requires periodic sensing for incumbent signal types. If so, the cognitive radio spectrum management logic 360 determines (506) if the sensing timer associated with that channel has elapsed. If so, the cognitive radio spectrum management logic 360 directs the cognitive radio device 320 to suspend communications and directs (508) the spectrum sensor 340 to sense the channel(s) for a detectable signal. If the spectrum sensor 340 fails to detect a signal(s), the channel(s) sensing ends, the timer(s) reset (524), and the process continues with step (526), as will be explained below in detail. However, if a detectable signal is sensed (510) on the channel(s), the cognitive radio spectrum management logic 360 determines (511) if the signal was detected on a current operating channel. If the channel was not an operating channel, the cognitive radio spectrum management logic 360 updates (512) the combined spectrum map 391 and, if required, the backup channel list 392 to mark the channel(s) as unavailable or, if required, to remove them from the backup channel list 392. The cognitive radio spectrum management logic 360 then resets the channel sensing timer(s) (524) and processing continues at (526). If the signal was detected on an operating channel(s), the cognitive radio spectrum management logic 360 examines the operating/backup channel list 392 to determine (513) if at least one backup channel is available. If there is more than one backup channel available (514), the cognitive radio spectrum management logic 360 may request (516) that the cognitive radio device 320 selects a new operating channel(s) from the operating/backup spectrum map, or may select the first available backup channel(s). In either event, the cognitive radio spectrum management logic 360 instructs (520) the cognitive radio device 320 to use the backup channel(s) as the new operating channel(s). The cognitive radio spectrum management logic 360 computes (522) an operating channel timer adjustment for the sensing time associated with the new operating channel(s). In one embodiment the timer adjustment computation is based on a selection of a lesser of a time remaining on the sensing timer associated with the channel(s) selected as the new operating channel(s) and a default operating channel sensing time, though another algorithm may be used as a matter of design choice. If it was determined (513) that the backup channel(s) entries in the operating/backup channel list 392 were empty, the operating/backup channel list 392 is refreshed by performing (518) a search for a new operating channel(s) and backup channel(s) as per steps (412)-(420) of FIG. 5.

The cognitive radio spectrum management logic 360 then determines (526) if the current spectrum map 388 has expired. The expiry time for a spectrum map 388 may be established by a regulatory authority, a standard, or assigned by the CRSDB 380 each time it sends out a new spectrum map 388. If the current spectrum map 388 has expired, the cognitive radio spectrum management logic 360 performs (534) spectrum map acquisition and processing, as described above with reference to steps (406)-(422) of FIG. 5.

If the spectrum map 388 has not expired, the cognitive radio spectrum management logic 360 determines (528) if its geo-location information 350 has changed. If so, the cognitive radio spectrum management logic 360 sends (532) its new location information to the variable resolution geo-location server 301 and performs spectrum map acquisition and processing (534) as described above with reference to steps (402)-(422) of FIG. 5.

If the geo-location information 350 has not changed, the cognitive radio spectrum management logic 360 determines (530) if it has detected movement greater than a predetermined threshold using any available motion sensing capability, for example global positioning system (GPS). If no motion has been detected, the cognitive radio spectrum management logic 360 returns to (500) and the process described above repeats. If motion that exceeds the threshold has been detected, cognitive radio spectrum management logic 360 sends (532) its new location information to the variable resolution geo-location server 301 and acquires and processes (534) a new spectrum map 388, as described above with reference to steps (402)-(422) of FIG. 5.

As is well understood, the most commonly used geo-location method implemented in cognitive radio devices is GPS. However, GPS signals cannot be reliably received in an indoor environment. This makes incumbent protection using geo-location and database lookup difficult to implement for indoor cognitive radio spectrum applications. The disclosed systems and methods may solve this problem by allowing multiple geo-location methods with variable geo-location resolution. As described above, with reduced geo-location certainty, incumbent protection can be guaranteed by making database inquiry results more conservative; however, this results in fewer cognitive radio spectrum channels in the inquiry responses. This drawback is overcome by the method described above by relying on the spectrum sensor 340 to determine if a channel is usable by the cognitive radio device 320.

A spectrum sensor 340 that can detect some but not all broadcast signals (e.g. low bandwidth services cannot be detected) can be used by the cognitive radio device 320. Of course, the fewer broadcast signals the spectrum sensor 340 of a cognitive radio device 320 can detect, the fewer cognitive radio spectrum channels can be located and utilized by that cognitive radio device 320, and the lower the spectrum efficiency. Moreover, with database inquiry results in accordance with disclosed embodiments, only channels with "detectable" signal types need to be sensed. This reduces the number of channels as well as the types of signals that must be sensed, which appreciably decreases sensing overhead. And, as explained above, use of the operating/backup spectrum map further reduces the sensing overhead by further limiting the sensing requirement.

Those of skill will appreciate that the various illustrative logical blocks, modules, units, logic, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps, logic, and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or logic or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

We claim:

1. A system for implementing a cognitive radio band device with enhanced spectrum sensing, comprising:
   a variable resolution geo-location server configured to receive geo-location information from the cognitive radio band device, translate the geo-location information into a location indicator, assign a location accuracy function to the location indicator, and return the location indicator to the cognitive radio band device;
   a cognitive radio band spectrum data_base front end configured to receive the location indicator from the cognitive radio band device and use the location indicator to compile an available spectrum map that is returned to the cognitive radio band device; and
   a spectrum sensor available to the cognitive radio band device, the spectrum sensor being adapted to detect certain cognitive radio band signal types.

2. The system as claimed in claim 1 further comprising a database of location indicator/cognitive radio channel table information that is used by the cognitive radio band spectrum data base front end to compile the available spectrum map.

3. The system as claimed in claim 1 further comprising a database of cognitive radio band device registration information that is maintained by the cognitive radio spectrum data base front end and used by the cognitive radio spectrum data base front end to communicate with the cognitive radio band device when required.

4. The system as claimed in claim 1 further comprising a database of geo-location interpretation information that is used by the variable resolution geo-location server to translate the geo-location information into the location indicator.

5. The system as claimed in claim 4 wherein the location accuracy function being expressed in a format that can be used by the cognitive radio spectrum data base to compile the available spectrum map that is returned to the cognitive radio band device.

6. A cognitive radio band device, comprising:
   a spectrum sensor adapted to sense certain cognitive radio band signal types based on a sensing map to produce a sensor map;
   memory for storing geo-location information and an operating/backup channel list; and
   cognitive radio spectrum management logic configured to
      provide a variable resolution geo-location server with the geo-location information;
      receive a location indicator from the variable resolution geo-location server;
      pass the location indicator to a cognitive radio spectrum database front end to request an available spectrum map from the cognitive radio spectrum database front end;
      inspect the available spectrum map to prepare the sensing map for the spectrum sensor;
      combine the available spectrum map and the sensor map using predetermined combination rules to produce a combined spectrum map; and
      select operating and backup channels for the operating/backup channel list from the combined spectrum map based in at least in part on sensing requirements.

7. A method for use in operating a cognitive radio band device, the method comprising:
   providing a variable resolution geo-location server with geo-location information available to the cognitive radio band device;
   receiving a location indicator from the variable resolution geo-location server;
   passing the location indicator to a cognitive radio spectrum database front end to request a available spectrum map from the cognitive radio spectrum database front end;
   inspecting the available spectrum map to prepare a sensing map for a spectrum sensor of the cognitive radio band device;
   sensing cognitive radio spectrum based on the sensing map to produce a sensor map;
   combining the available spectrum map and the sensor map using predetermined combination rules to produce a combined spectrum map; and
   selecting operating and backup channels for an operating/backup channel list from the combined spectrum map based in at least in part on sensing requirements.

8. The method as claimed in claim 7, wherein
   the predetermined combination rules include weightings based on a probability of false alarm and a probability of detection.

9. The method as claimed in claim 7 further comprising determining whether a current available spectrum map has expired.

10. The method as claimed in claim 9, wherein if the current available spectrum map has expired, the method further comprises:
    passing the location indicator to the cognitive radio spectrum database front end and requesting a new available spectrum map from the cognitive radio spectrum database front end; and
    inspecting the new available spectrum map to create a new sensing map for use in sensing cognitive radio spectrum.

11. The method as claimed in claim 7, further comprising:
    starting sensing timers for the channels in the combined spectrum map; and
    determining whether one of the sensing timers has expired.

12. The method as claimed in claim 11 further comprising:
    in the case that one of the sensing timers has expired, sensing the channel associated with the expired sensing timer to determine if a signal can be detected; and
    if a signal cannot be detected on the channel, resetting the sensing timer associated with that channel.

13. The method as claimed in claim 12, further comprising in the case that the channel associated with the expired sensing timer is an operating channel, inspecting the operating/backup channel list to determine if at least one backup channel is available.

14. The method as claimed in claim 13, further comprising in the case that at least one backup channel is available, selecting one of the at least one backup channels as a new operating channel.

15. The method as claimed in claim 14 further comprising computing a sensing timer adjustment for the new operating channel based on the time remaining on the sensing timer associated with the channel selected as the new operating channel and a default operating channel sensing time.

16. The method as claimed in claim 7 further comprising determining whether the geo-location information has changed.

17. The method as claimed in claim 16 wherein if the geo-location information has changed the method further comprises:
- providing the variable resolution geo-location server with the changed geo-location information;
- receiving a new location indicator from the variable resolution geo-location server;
- passing the new location indicator to the cognitive radio spectrum database front end and requesting a new available spectrum map from the cognitive radio spectrum database front end; and
- inspecting the new available spectrum map to prepare the sensing map for the spectrum sensor.

18. The method as claimed in claim 7 wherein the method further comprises determining whether movement of the cognitive radio band device that exceeds a predetermined threshold has been detected.

19. The method as claimed in claim 18 wherein if the movement of the cognitive radio band device that exceeds the predetermined threshold has been detected, the method further comprises:
- providing the variable resolution geo-location server with geo-location information associated with a new location of the cognitive radio band device;
- receiving a new location indicator from the variable resolution geo-location server;
- passing the new location indicator to the cognitive radio spectrum database front end and requesting a new available spectrum map from the cognitive radio spectrum database front end; and
- inspecting the new available spectrum map to prepare a new sensing map for the spectrum sensor.

20. The method as claimed in claim 12, wherein sensing timers associated with operating and backup channels have different timer values.

21. The method as claimed in claim 20, wherein the timer values are chosen so that an operating channel is sensed more frequently than a backup channel.

22. The method as claimed in claim 21, wherein the timer values are chosen so that a backup channel is sensed more frequently than a channel that is neither a backup channel nor an operating channel.

23. The cognitive radio band device as claimed in claim 6, wherein the predetermined combination rules include weightings based on a probability of false alarm and a probability of detection.

24. The cognitive radio band device as claimed in claim 6, wherein the cognitive radio spectrum management logic is further configured to determine whether a current available spectrum map has expired.

25. The cognitive radio band device as claimed in claim 24, wherein the cognitive radio spectrum management logic is further configured, if the current available spectrum map has expired, to:
- pass the location indicator to the cognitive radio spectrum database front end and request a new available spectrum map from the cognitive radio spectrum database front end; and
- inspect the new available spectrum map to create a new sensing map for the spectrum sensor.

26. The cognitive radio band device as claimed in claim 6, wherein the cognitive radio spectrum management logic is further configured to:
- start sensing timers for the channels in the combined spectrum map; and
- determine whether one of the sensing timers has expired.

27. The cognitive radio band device as claimed in claim 26, wherein the cognitive radio spectrum management logic is further configured to:
- in the case that one of the sensing timers has expired, cause the spectrum sensor to sense the channel associated with the expired sensing timer to determine if a signal can be detected; and
- if a signal cannot be detected on the channel, reset the sensing timer associated with that channel.

28. The cognitive radio band device as claimed in claim 27, wherein the cognitive radio spectrum management logic is further configured to, in the case that the channel associated with the expired sensing timer is an operating channel, inspect the operating/backup channel list to determine if at least one backup channel is available.

29. The cognitive radio band device as claimed in claim 28, wherein the cognitive radio spectrum management logic is further configured to, in the case that at least one backup channel is available, select one of the at least one backup channels as a new operating channel.

30. The cognitive radio band device as claimed in claim 29, wherein the cognitive radio spectrum management logic is further configured to compute a sensing timer adjustment for the new operating channel based on the time remaining on the sensing timer associated with the channel selected as the new operating channel and a default operating channel sensing time.

31. The cognitive radio band device as claimed in claim 6, wherein the cognitive radio spectrum management logic is further configured to determine whether the geo-location information has changed.

32. The cognitive radio band device as claimed in claim 31, wherein the cognitive radio spectrum management logic is further configured to, if the geo-location information has changed:
- provide the variable resolution geo-location server with the changed geo-location information;
- receive a new location indicator from the variable resolution geo-location server;
- pass the new location indicator to the cognitive radio spectrum database front end and request a new available spectrum map from the cognitive radio spectrum database front end; and
- inspect the new available spectrum map to prepare the sensing map for the spectrum sensor.

33. The cognitive radio band device as claimed in claim 6, wherein the cognitive radio spectrum management logic is further configured to determine whether movement of the cognitive radio band device that exceeds a predetermined threshold has been detected.

34. The cognitive radio band device as claimed in claim 33, wherein the cognitive radio spectrum management logic is further configured to, if the movement of the cognitive radio band device that exceeds the predetermined threshold has been detected:
- provide the variable resolution geo-location server with geo-location information associated with a new location of the cognitive radio band device;
- receive a new location indicator from the variable resolution geo-location server;
- pass the new location indicator to the cognitive radio spectrum database front end and request a new available spectrum map from the cognitive radio spectrum database front end; and
- inspect the new available spectrum map to prepare a new sensing map for the spectrum sensor.

35. The cognitive radio band device as claimed in claim 27, wherein sensing timers associated with operating and backup channels have different timer values.

36. The cognitive radio band device as claimed in claim 35, wherein the timer values are chosen so that an operating channel is sensed more frequently than a backup channel.

37. The cognitive radio band device as claimed in claim 36, wherein the timer values are chosen so that a backup channel is sensed more frequently than a channel that is neither a backup channel nor an operating channel.

* * * * *